United States Patent
Yu et al.

(10) Patent No.: US 11,118,601 B2
(45) Date of Patent: **\*Sep. 14, 2021**

(54) GAS TURBINE ENGINE WITH PARTIAL INLET VANE

(71) Applicant: PRATT & WHITNEY CANADA CORP., Longueuil (CA)

(72) Inventors: Hong Yu, Oakville (CA); Peter Townsend, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 204 days.

This patent is subject to a terminal disclaimer.

(21) Appl. No.: 16/151,666

(22) Filed: Oct. 4, 2018

(65) Prior Publication Data

US 2019/0107119 A1    Apr. 11, 2019

Related U.S. Application Data

(63) Continuation of application No. 14/493,785, filed on Sep. 23, 2014, now Pat. No. 10,378,554.

(51) Int. Cl.
*F04D 29/54* (2006.01)
*F02C 7/042* (2006.01)
(Continued)

(52) U.S. Cl.
CPC ............ *F04D 29/542* (2013.01); *F02C 7/042* (2013.01); *F02C 7/045* (2013.01); *F02C 7/047* (2013.01);
(Continued)

(58) Field of Classification Search
None
See application file for complete search history.

(56) References Cited

U.S. PATENT DOCUMENTS 3,333,794 A    8/1967  Manns
3,610,262 A    10/1971 Wise
(Continued)

FOREIGN PATENT DOCUMENTS

CN    101922312    12/2010
CN    103835810     6/2014
(Continued)

OTHER PUBLICATIONS

Deng, CN 103835810 english description translation.*
Opposition to parent EP Patent—English Translation.

*Primary Examiner* — Ninh H. Nguyen
*Assistant Examiner* — Jason Fountain
(74) *Attorney, Agent, or Firm* — Norton Rose Fulbright Canada LLP

(57) ABSTRACT

A turbofan engine including an axially extending inlet wall surrounding an inlet flow path. A radial distance between the inlet wall and the inner wall adjacent the fan defines a downstream height of the inlet flow path. A plurality of vanes are circumferentially spaced around the inlet, each of the vanes extending radially inwardly from the inlet wall, a maximum radial distance between a tip of each of the vanes and the inlet wall defining a maximum height of the vane. The maximum height of the vane is at most 50% of the downstream height of the flow path. In another embodiment, the maximum height of the vane is at most 50% of the maximum fan blade span. A method of reducing a relative Mach number at fan blade tips is also discussed.

20 Claims, 5 Drawing Sheets

(51) Int. Cl.
   *F02C 7/045*   (2006.01)
   *F02C 7/047*   (2006.01)
   *F04D 29/68*   (2006.01)
   *F04D 29/58*   (2006.01)
   *F04D 29/56*   (2006.01)

(52) U.S. Cl.
   CPC ......... *F04D 29/544* (2013.01); *F04D 29/563* (2013.01); *F04D 29/584* (2013.01); *F04D 29/5853* (2013.01); *F04D 29/681* (2013.01); *F05D 2260/961* (2013.01)

(56) References Cited

U.S. PATENT DOCUMENTS

| | | | |
|---|---|---|---|
| 3,819,008 A | 6/1974 | Evans et al. | |
| 3,937,590 A | 2/1976 | Mani | |
| 4,076,454 A | 2/1978 | Wennerstrom | |
| 4,104,002 A | 8/1978 | Ehrich | |
| 4,354,346 A | 10/1982 | Wooding | |
| 4,354,804 A | 10/1982 | Cruzen | |
| 4,844,692 A | 7/1989 | Minkkinen et al. | |
| 5,275,531 A | 1/1994 | Roberts | |
| 5,365,731 A | 11/1994 | Nikkanen et al. | |
| 5,474,417 A | 12/1995 | Privett et al. | |
| 5,489,186 A | 2/1996 | Yapp et al. | |
| 5,607,284 A | 3/1997 | Byrne et al. | |
| 5,628,622 A | 5/1997 | Thore et al. | |
| 5,762,470 A | 6/1998 | Gelmedov et al. | |
| 6,139,259 A | 10/2000 | Ho et al. | |
| 6,179,551 B1 | 1/2001 | Sathianathan et al. | |
| 6,227,794 B1 | 5/2001 | Wojtyczka et al. | |
| 6,508,624 B2 | 1/2003 | Nadeau et al. | |
| 6,514,039 B1 | 2/2003 | Hand | |
| 6,540,478 B2 | 4/2003 | Fiala et al. | |
| 6,655,632 B1 | 12/2003 | Gupta et al. | |
| 7,118,331 B2 | 10/2006 | Shahpar | |
| 7,444,802 B2 | 11/2008 | Parry | |
| 7,665,964 B2 | 2/2010 | Taylor et al. | |
| 7,797,944 B2 | 9/2010 | Morford et al. | |
| 7,861,823 B2 | 1/2011 | Prasad et al. | |
| 7,914,251 B2 | 3/2011 | Pool et al. | |
| 8,046,915 B2 | 11/2011 | Xie et al. | |
| 8,186,942 B2 | 5/2012 | Haas | |
| 8,366,047 B2 | 2/2013 | Euvino, Jr. et al. | |
| 8,403,624 B2 | 3/2013 | Xie et al. | |
| 8,461,713 B2 | 6/2013 | Sammy | |
| 8,540,490 B2 | 9/2013 | Ramakrishnan et al. | |
| 8,636,464 B2 | 1/2014 | Bottome | |
| 8,756,909 B2 | 6/2014 | Avery | |
| 9,091,174 B2 | 7/2015 | Bagnall | |
| 2011/0164967 A1 | 7/2011 | Elorza Gomez et al. | |
| 2012/0087787 A1 | 4/2012 | Brown | |
| 2012/0240594 A1 | 9/2012 | Shamara | |
| 2012/0263587 A1 | 10/2012 | Hergt et al. | |
| 2013/0045370 A1 | 2/2013 | Aho et al. | |
| 2013/0153456 A1 | 6/2013 | Zhu et al. | |
| 2013/0202424 A1 | 8/2013 | Lussier et al. | |
| 2013/0266439 A1 | 10/2013 | Rubak et al. | |
| 2014/0010638 A1 | 1/2014 | Perrot et al. | |
| 2014/0030071 A1 | 1/2014 | Leslie et al. | |
| 2014/0219792 A1 | 8/2014 | Topol et al. | |
| 2014/0286768 A1 | 9/2014 | Boniface et al. | |
| 2015/0260051 A1 | 9/2015 | Gallagher et al. | |
| 2016/0084162 A1 | 3/2016 | Abrari et al. | |
| 2016/0084265 A1 | 3/2016 | Yu et al. | |
| 2016/0186690 A1 | 6/2016 | Florea et al. | |
| 2016/0312618 A1 | 10/2016 | Macchia | |
| 2016/0312641 A1 | 10/2016 | Macchia | |
| 2017/0145840 A1 | 5/2017 | Di Mare et al. | |
| 2017/0145959 A1 | 5/2017 | Baralon | |
| 2017/0147741 A1 | 5/2017 | Di Mare et al. | |
| 2017/0152861 A1 | 6/2017 | Japikse | |
| 2017/0248156 A1 | 8/2017 | Parker et al. | |

FOREIGN PATENT DOCUMENTS

| | | |
|---|---|---|
| DE | 102012003902 | 6/2013 |
| EP | 1956247 | 8/2008 |
| GB | 623142 | 5/1949 |
| GB | 2405184 | 2/2005 |
| JP | 2000095195 | 4/2000 |
| WO | 9809066 | 3/1998 |
| WO | 02/29224 | 4/2002 |
| WO | 20140023891 | 2/2014 |

\* cited by examiner

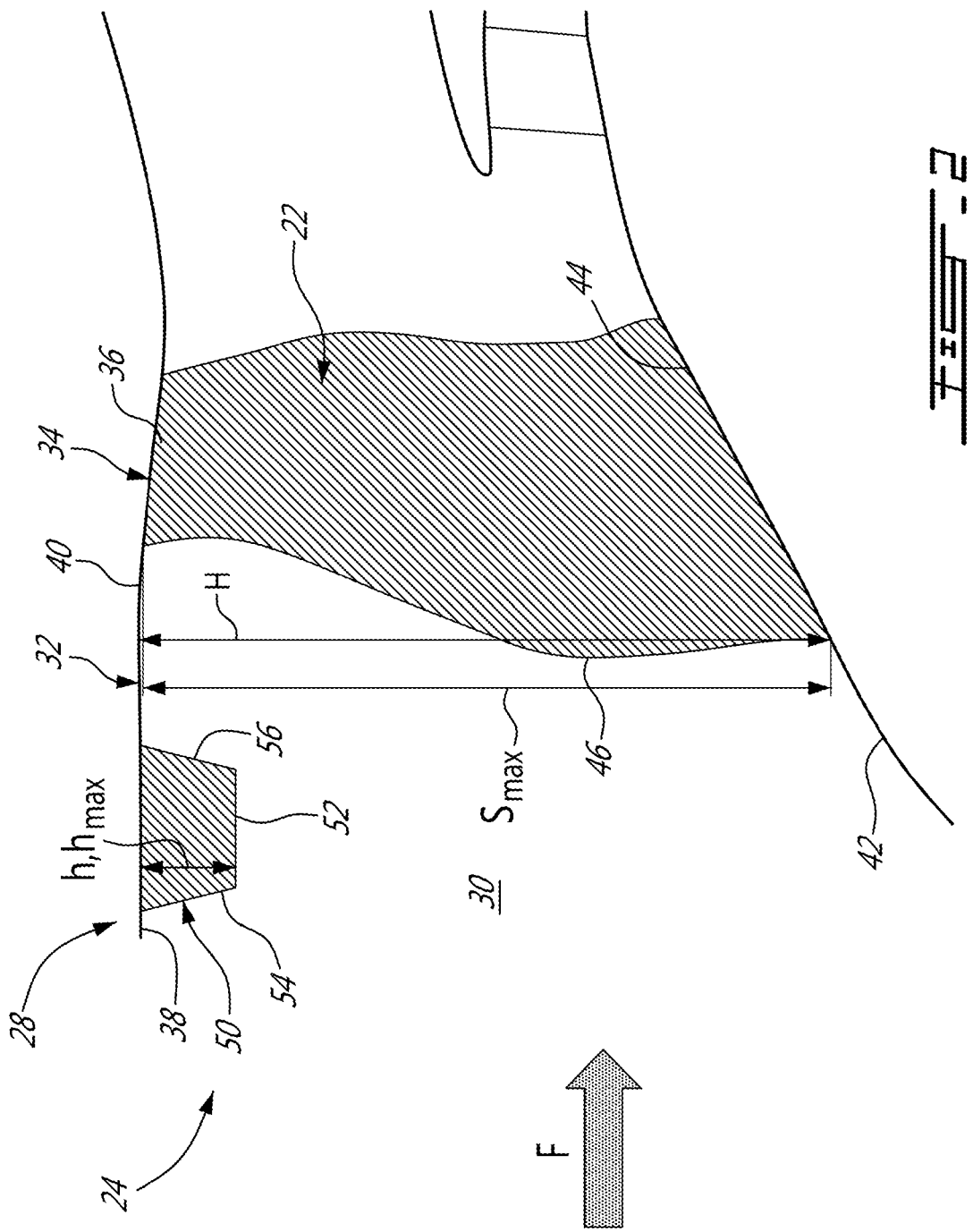

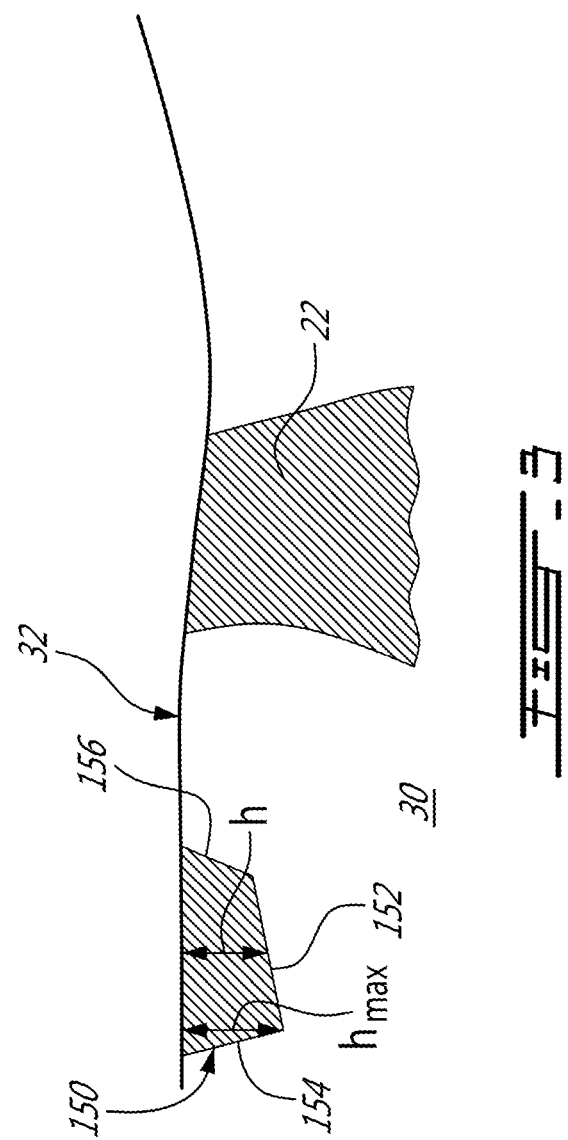

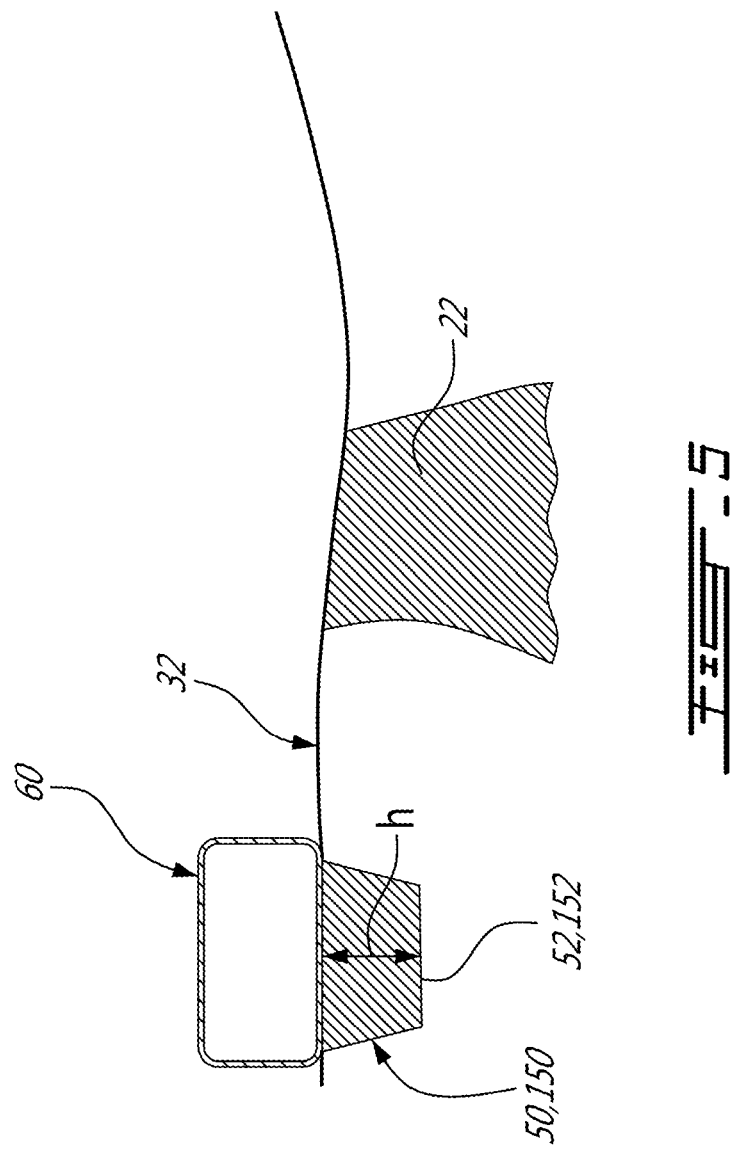

GAS TURBINE ENGINE WITH PARTIAL INLET VANE

CROSS-REFERENCE TO RELATED APPLICATIONS

The present application is a continuation of U.S. application Ser. No. 14/493,785 filed Sep. 23, 2014 the content of this application being incorporated herein by reference.

TECHNICAL FIELD

The application relates generally to gas turbine engines and, more particularly, to inlets for turbofan engines.

BACKGROUND OF THE ART

Typical transonic fans for turbofan engines have a rather high relative tip Mach number, for example approximately 1.5. This usually leads to shock losses and boundary layer separation, which reduce fan tip efficiency, and accordingly reduce the overall efficiency of the fan.

Moreover, the tip section of the fan blade leading edge, being the least structurally supported area of the blade, is generally most at risk of damage, for example due to foreign object damage (FOD).

SUMMARY

In one aspect, there is provided a turbofan engine, the engine comprising: a propulsive fan; an inlet wall surrounding an inlet flow path, the inlet wall extending axially from an upstream end to a downstream end adjacent the fan, the inlet wall at the downstream end surrounding an annular portion of the inlet flow path bordered radially inwardly by an annular inner wall, a radial distance between the inlet wall and the inner wall adjacent the fan defining a downstream height of the inlet flow path; and a plurality of vanes circumferentially spaced around the inlet, each of the vanes extending radially inwardly from the inlet wall, a maximum radial distance between a tip of each of the vanes and the inlet wall defining a maximum height of the vane, the maximum height of each of the vanes being at most 50% of the downstream height of the flow path.

In another aspect, there is provided a gas turbine engine comprising: a propulsive fan including an array of circumferentially spaced blades configured for rotation, each of the blades extending radially between a root and a tip with a maximum radial dimension between the root and the tip defining a maximum blade span; an annular inlet including: an axially extending wall, the wall having an upstream wall portion extending axially upstream from the fan blades, the upstream wall portion defining an inlet flow path for directing air to the fan, and a plurality of vanes circumferentially spaced around the inlet, each of the vanes extending radially inwardly from the upstream wall portion, a maximum radial distance between a tip of each of the vanes and the upstream wall portion defining a maximum height of the vane, the maximum height of each of the vanes being at most 50% of the maximum blade span.

In a further aspect, there is provided a method of reducing a relative Mach number at tips of fan blades of a gas turbine engine, the method comprising: directing a flow of air to the fan blades through an inlet flow path having a downstream radial height adjacent the fan blades, including: swirling the flow of air upstream of the blade tips within an annular outer portion of the inlet flow path, the annular outer portion extending a radial distance from a wall surrounding the inlet flow path, the radial distance being at most 50% of the downstream radial height; and allowing the flow of air to flow freely within a remaining central portion of the inlet flow path.

DESCRIPTION OF THE DRAWINGS

Reference is now made to the accompanying figures in which:

FIG. 2 is a schematic cross-sectional view of part of a fan and inlet of a gas turbine engine such as shown in FIG. 1, in accordance with a particular embodiment;

FIG. 3 is a schematic cross-sectional view of part of a fan and inlet of a gas turbine engine such as shown in FIG. 1, in accordance with another particular embodiment;

FIG. 5 is a schematic cross-sectional view of vanes of the inlet with a heating system, in accordance with particular embodiments, shown with part of the fan.

DETAILED DESCRIPTION

Figure 1:
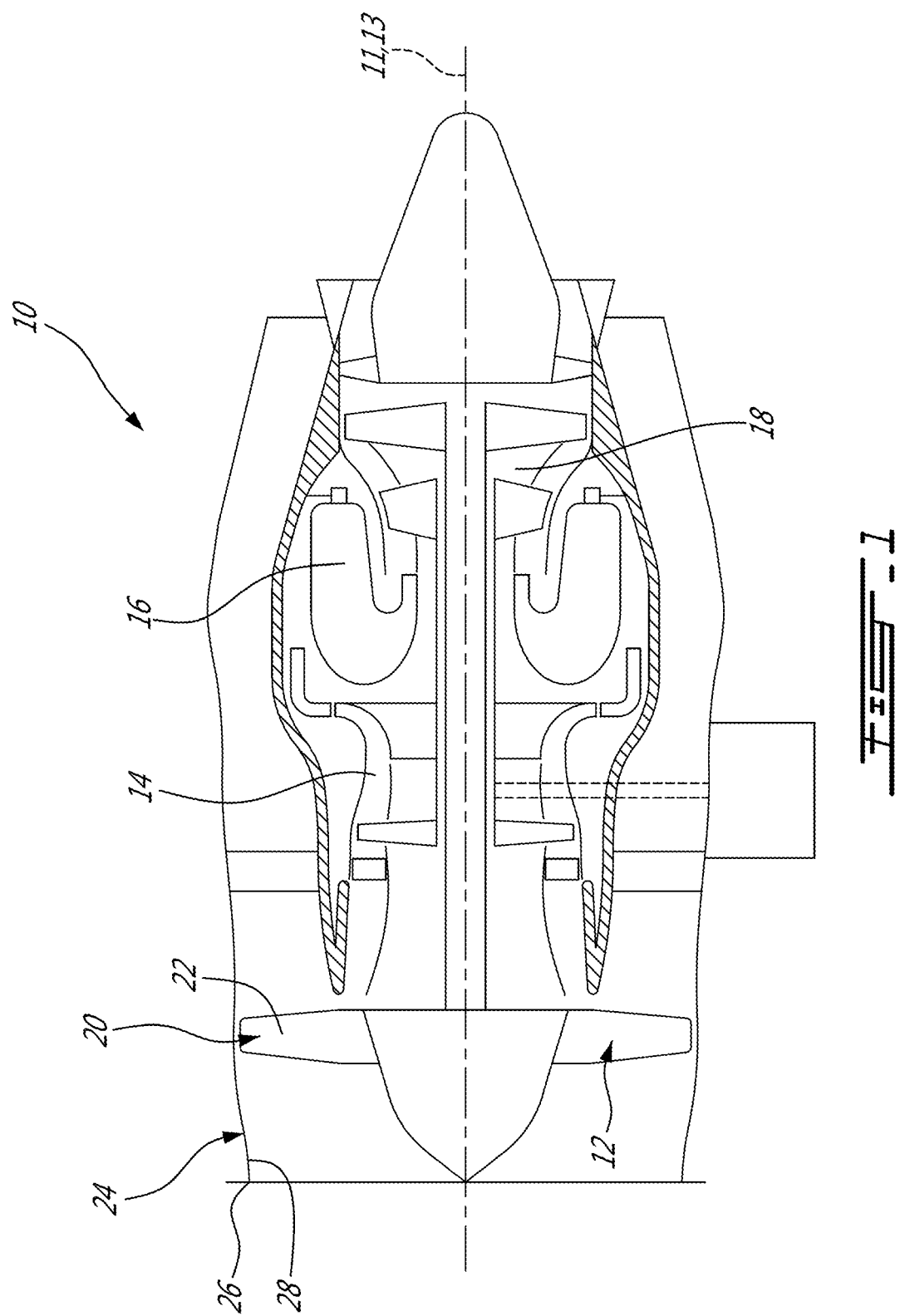
FIG. 1 is a schematic cross-sectional view of a gas turbine engine.

FIG. 1 illustrates a gas turbine engine 10 of a type preferably provided for use in subsonic flight, generally comprising in serial flow communication a propulsive fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

The fan 12 has at least one rotor 20, the rotor 20 including an array of circumferentially spaced blades 22 configured for rotation about a central longitudinal axis 11 of the engine 10. The engine 10 has an inlet 24 directing the ambient air to the fan 12. The inlet 24 generally includes an annular inlet lip 26 and an inlet wall 28. The inlet 24 has a central longitudinal axis 13. In the embodiment shown, the central longitudinal axis 13 of the inlet 24 corresponds to the central longitudinal axis 11 of the engine 10. Alternately, the two axes 11, 13 may be offset from one another.

Referring to FIG. 2, the inlet wall 28 includes upstream and downstream wall portions 32, 34. The downstream wall portion 34 surrounds the fan blades 22 so that the fan blade tips 36 are located in proximity of the inlet wall 28, and surrounds the flow path through which the fan blades 22 rotate. The upstream wall portion 32 extends axially upstream from the downstream wall portion 34, and surrounds the inlet flow path 30 through which the air passes to reach the fan blades 22. The upstream wall portion 32 thus has an upstream end 38 at the inlet lip 26 and a downstream end 40 at the transition with the downstream wall portion 34, adjacent the fan 12. The inlet flow path 30 is annular at least at the downstream end 40, bordered on its inner side by an annular inner wall 42 which in a particular embodiment is defined in part by the nose cone.

It can be seen that each fan blade extends radially between a root 44 (defining part of the inner wall 42) and the blade tip 36, with a maximum radial dimension between the root 44 and the tip 36 defining a maximum blade span $S_{max}$, which in the embodiment shown is located at the leading edge 46 of the fan blade 22. The flow path 30 has a downstream height H adjacent the fan 12 defined radially between the inlet wall 28 and the inner wall 42. In the embodiment shown, as the fan blade tips 36 extend in close proximity of the inlet wall 28, the fan blade roots 44 form part of the inner wall 42, and the maximum fan blade span $S_{max}$ is defined at the leading edge 46 thus adjacent the downstream height H, the maximum fan blade span $S_{max}$ and the downstream height H have values that are close to one another. Other configurations are also possible.

Still referring to FIG. 2, the inlet 24 further includes an array of vanes 50 circumferentially spaced therearound. Each vane 50 extends radially inwardly from the upstream wall portion 32. The vanes 50 are partial vanes, i.e. they do not extend completely across the inlet flow path 30. The vane tips 52 are thus radially outwardly spaced from the central longitudinal axis 13, and, for embodiments where the vanes 50 extend in an annular section of the flow path 30, as shown, also radially outwardly spaced from the inner wall 42.

The height h of each vane 50 can be defined as the radial distance between its tip 52 and the upstream wall portion 32 at the base of the vane 50. In the embodiment show in FIG. 2, the height h of the vane is constant along the axial direction, i.e. from the leading edge 54 to the trailing edge 56 of the vane 50, and accordingly the maximum height $h_{max}$ of the vane 50 is defined by the vane height h at any axial location.

In an alternate embodiment shown in FIG. 3, the height h of the circumferentially spaced partial vanes 150 varies along the axial direction, i.e. between the leading edge 154 and the trailing edge 156 of the vane 150. In a particular embodiment, the irregular height h allows for an optimisation of the vane weight with respect to the performance gain provided by the presence of the vanes 150. The maximum radial distance between the vane tip 152 and the upstream wall portion 32 at the base of the vane 150 defines the maximum height $h_{max}$ of the vane 150. Although the maximum height $h_{max}$ is shown as being located at the leading edge 154, other configurations are also possible.

In a particular embodiment, both for vanes 50 with constant height h and for vanes 150 with irregular height h, the maximum height $h_{max}$ of each vane 50, 150 is at most 50% of the downstream height H of the flow path 30. In a particular embodiment, the maximum height $h_{max}$ of each vane is at most 25% of the downstream height H of the flow path 30.

In a particular embodiment, both for vanes 50 with constant height h and for vanes 150 with irregular height h, the maximum height $h_{max}$ of each vane 50, 150 is at most 50% of the maximum blade span $S_{max}$. In a particular embodiment, the maximum height $h_{max}$ of each vane 50, 150 is at most 25% of the maximum blade span $S_{max}$.

Although the vanes 50, 150 are schematically depicted in FIGS. 2-3 has having a straight tip 52, 152, alternately, the vane tips 52, 152 may have a different shape, e.g. rounded or curved, whether concave or convex.

Figure 4B:
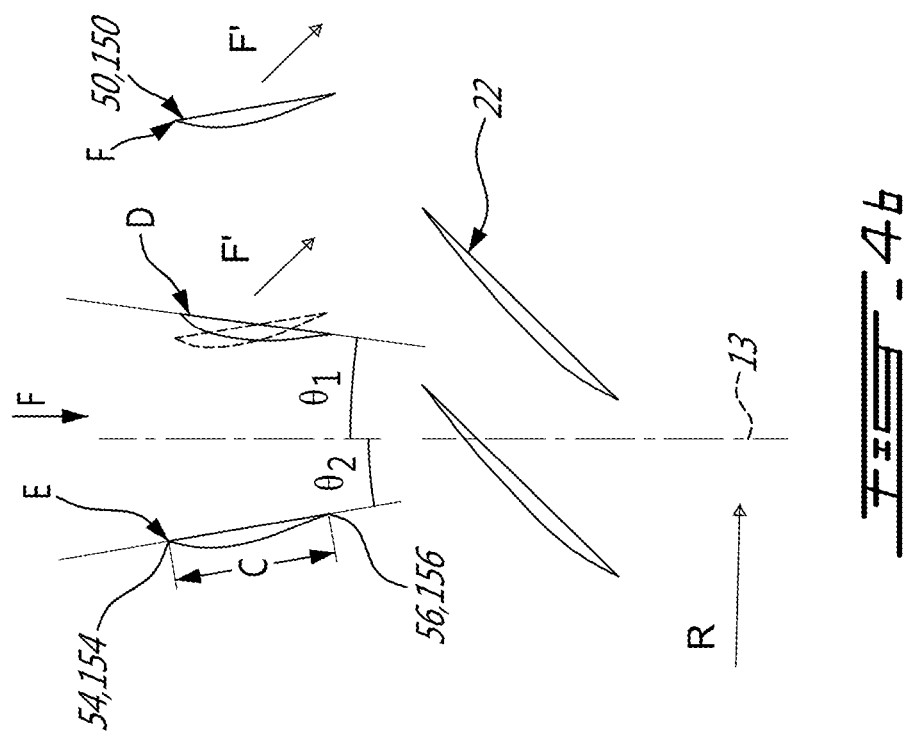
FIGS. 4a and 4b are schematic top views of vanes of the inlet, in accordance with particular embodiments.

The vanes 50, 150 have a relatively small aspect ratio, which is defined as the ratio between the maximum height $h_{max}$ of the vane 50, 150 and a chord length c (extending between the leading edge 54, 154 and trailing edge 56, 156, see FIG. 4b), thus as $h_{max}/c$. In a particular embodiment, the aspect ratio $h_{max}/c$ is about 0.5; in another embodiment, the aspect ratio $h_{max}/c$ is 0.5 or lower.

Figure 4A:
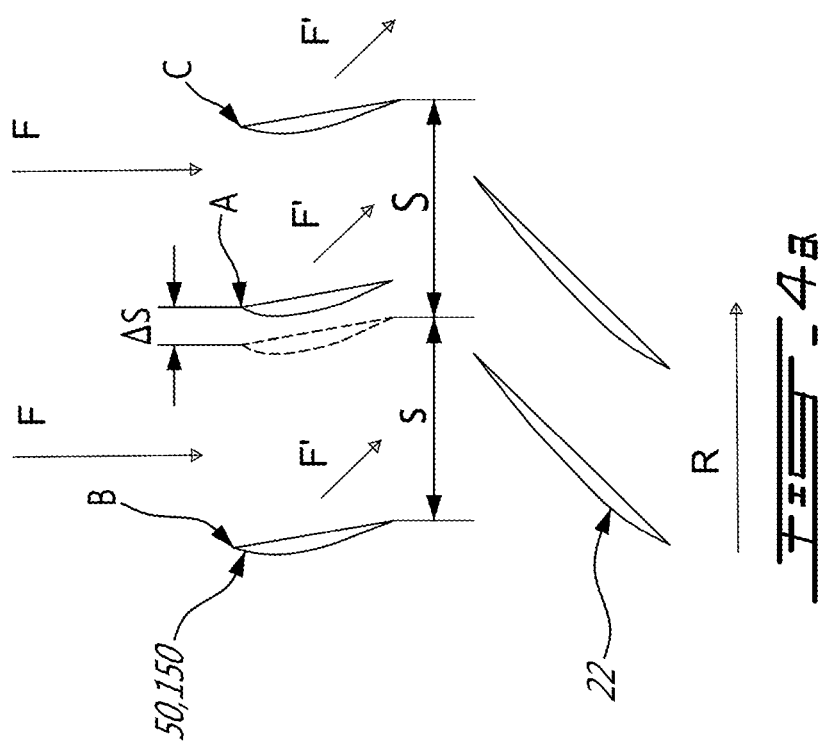

Referring to FIG. 4a, in a particular embodiment, the vanes 50, 150 are irregularly spaced apart around the circumference of the inlet 24; a circumferential distance between a first vane and an adjacent vane is thus different from a circumferential distance between that first vane and the opposed adjacent vane. The first vane A is shown in full lines, and the position shown in dotted lines represents the position at equal circumferential distance S from the two adjacent vanes B, C. It can be seen that the intermediate first vane A is offset away from one of the adjacent vanes B by a distance ΔS, so as to be located a distance S+ΔS from that adjacent vane B and S−ΔS from the other adjacent vane C. In a particular embodiment, ΔS is about 5% of S; in another embodiment, ΔS is 5% or less of S. The irregularly spaced vanes 50, 150 include embodiments where the ΔS for all the offset vanes is the same, embodiments where the circumferential spacing between the vanes of three (3) or more pairs of the vanes is different from one another, and embodiments where all the vanes have different circumferential spacing from one another. In a particular embodiment, the irregular circumferential spacing of the vanes 50, 150 misstunes the interaction between the vane wake and the fan rotor 20, which may lead to reduction of rotor dynamic stress and fan tone noise.

In an alternate embodiment, the vanes 50, 150 are regularly spaced apart around the circumference of the inlet 24, i.e. each vane 50, 150 is spaced a same circumferential distance S from the adjacent vanes 50, 150.

Referring to FIG. 4b, in a particular embodiment, at least some of the vanes 50, 150 have different stagger angles from one another. The stagger angle is defined as the angle between the chord c (extending from the leading edge 54, 154 to the trailing edge 56, 156) and the direction of flow F, corresponding here to the central longitudinal axis 11. It can be seen that one of the vanes D has a stagger angle $\theta_1$ while the adjacent vanes E, F have a different stagger angle of $\theta_2$. Although shown here as being oriented in different directions, in another embodiment the adjacent vanes D, E, F are angled in the same direction with respect to the direction of flow F, one vane D being more or less angled than the others E, F. In a particular embodiment, $\theta_1$ and $\theta_2$ are defined in the same direction and have a difference of 1 degree. In a particular embodiment, the irregular stagger may lead to reduction in rotor dynamics stress and fan tone noise, and/or reduction of flutter in the fan blades 22.

In an alternate embodiment, the vanes 50, 150 all have a same stagger angle.

Still referring to FIGS. 4a and 4b, it can be appreciated that the vanes 50, 150 are configured to direct the incoming flow F of upstream air into the direction of rotation R of the fan blades 22. More particularly, from FIGS. 4a and 4b, it can be appreciated that the incoming flow F is redirected from a direction F to a direction F' having a circumferential component pointing in the direction of rotation R of the fan blades 22. It can also be appreciated that the pressure side of the vanes 50, 150 faces the same side as that of the pressure side of the fan blades 22.

In a particular embodiment, the stagger angle is selected so that the exit angle of the flow or swirl induced in the flow by the vanes 50, 150 reduces the relative Mach number at the fan blade tips 36 to a value of Mach 1.3 or less, and in an embodiment to a value of at least Mach 1.2 and at most Mach 1.3. In a particular embodiment, such a flow speed provides for an optimal balance between the gain in fan blade efficiency obtained through reduction of the shock losses, and the losses (e.g. friction losses) introduced by the presence of the vanes 50, 150 in the flow path 30, such as to improve the overall efficiency of the fan 12.

In use, the relative Mach number at the fan blade tips 36 is thus reduced by swirling the flow of air upstream of the fan blade tips 36 within an annular outer portion of the inlet flow path 30, i.e. the annular portion of the flow path 30 containing the vanes 50, 150, while allowing the flow of air to flow freely within the remaining central portion of the inlet flow path 30, i.e. the vane-free portion of the inlet flow path 30.

In a particular embodiment, the vanes 50, 150, whether irregularly or regularly staggered, have a stagger angle $\theta_1$, $\theta_2$ which is 20 degrees or less adjacent the upstream wall portion 32. In a particular embodiment, the stagger angle $\theta_1$, $\theta_2$ is from 10 to 15 degrees adjacent the upstream wall portion 32.

In a particular embodiment, the vanes 50, 150 are pivotally retained to the inlet wall 28 such that the stagger angle is variable, for example for adjustment with respect to the flow conditions in the inlet 24. In a particular embodiment, the variable stagger allows for an improvement in stall margin at part-design speed by closing the variable vanes, and/or an increase in fan choke flow at over speed by opening the variable vanes.

Referring to FIG. 5, in a particular embodiment, the inlet 24 further includes a heating system 60 in heat exchange relationship with the vanes 50, 150. The heating system 60 may include one or more conduits circulating a heated fluid (e.g. air, oil) around the upstream wall portion 32 radially outwardly of the inlet flow path 30, positioned in heat exchange relationship with the vanes 50, 150, for example by being adjacent to the upstream wall portion 32 and in axial alignment with the vanes 50, 150. In some embodiments, the height h of the vanes 50, 150 is sufficiently small for the heat from the heating system 60 to effectively travel from the upstream wall portion 32 directly through the material of the vanes 50, 150 up to vane tips 52, 152. In some embodiments, particularly with longer vanes 50, 150, the heating system 60 includes one or more passages for circulating the heated fluid disposed inside the vanes 50, 150, such as to help transfer the heat from the heated fluid across the height h of the vanes 50, 150.

It is understood that any of the variations shown and discussed can be used in combination with one or more of the other variations shown and discussed. For example, the vanes may have an irregular height h while being circumferentially irregularly spaced apart with different stagger angles and in heat exchange relationship with the heating mechanism. In a particular embodiment, the vanes 150 have an irregular height h, an irregular spacing, a same stagger angle, and are in heat exchange relationship with the heating system 60. Any other combination is possible.

In a particular embodiment, the addition of the partial vanes 50, 150 upstream of the fan 12 allows to improve basic performances of the fan 12 without changes to the rest of the engine 10 and/or to the cycle of the engine 10, which may provide for a performance enhancement which is relatively simple to implement.

In a particular embodiment, the vanes 50, 150 are designed by first selecting the vane exit angle so that the relative Mach number at the fan blade tips 36 is at a desired value. In a particular embodiment, the vane exit angle is less than 20 degrees at the upstream wall portion 32, preferably from 10 to 15 degrees at the upstream wall portion 32, and is selected to obtain a relative Mach number at the fan blade tips 36 of at least 1.2 and at most 1.3.

The turning of the fan blades 22 is then adjusted so that the pressure ratio at the blade tips 36 is maintained. This may include, for example, an increase in camber at the fan blade tips 36.

The vane maximum thickness and thickness at the leading edge of the vanes 54, 154 are then selected based on foreign object damage (FOD) considerations, as the vanes 50, 150 are exposed to foreign objects penetrating the inlet flow path 30. In a particular embodiment, the vanes 50, 150 are further configured to provide FOD and/or ice sheet damage protection to the fan blade tips 36, for example by selecting a spacing between the vanes 50, 150 which is smaller than the dimension of a foreign object (e.g. bird) that needs to be deflected away from the blade tips 36. Accordingly, the presence of the vanes 50, 150 may allow the fan blade tips 36 to be thinner, which may increase the fan tip efficiency.

The vane height h is selected to minimize the friction losses introduced by the presence of the vanes 50, 150 in the flow path 30 while being sufficient to obtain the desired Mach number at the fan blade tips 36.

The above description is meant to be exemplary only, and one skilled in the art will recognize that changes may be made to the embodiments described without departing from the scope of the invention disclosed. Modifications other than those expressly mentioned which fall within the scope of the present invention will be apparent to those skilled in the art, in light of a review of this disclosure, and such modifications are intended to fall within the appended claims.

The invention claimed is:

1. A turbofan engine, the engine comprising:
a propulsive fan mounted for rotation about an axis, the propulsive fan having fan blades;
an inlet for directing ambient air to the propulsive fan, the inlet having an inlet wall surrounding an inlet flow path, the inlet wall extending axially from an upstream end to a downstream end adjacent the propulsive fan, the inlet wall at the downstream end surrounding an annular portion of the inlet flow path bordered radially inwardly by an annular inner wall, a radial distance between the inlet wall and the annular inner wall adjacent the propulsive fan defining a downstream height of the inlet flow path; and
a plurality of vanes circumferentially spaced around the inlet, each of the vanes extending radially inwardly from the inlet wall, each of the plurality of vanes having an airfoil cross-section including a pressure wall and a suction wall extending chordwise between a leading edge and a trailing edge, a maximum radial distance between a tip of each of the vanes and the inlet wall defining a maximum height of each of the plurality of vanes, the maximum height being at most 50% of the downstream height of the inlet flow path, and wherein the plurality of vanes are oriented to induce a swirl to an incoming flow within the annular portion of the inlet flow path about the axis of the propulsive fan in a direction of rotation of the propulsive fan and to reduce a relative Mach number at the tips of the fan blades.

2. The engine as defined in claim 1, wherein the maximum height of each of the vanes is at most 25% of the downstream height of the flow path.

3. The engine as defined in claim 1, wherein the height of each of the vanes varies between the leading edge and the trailing edge of the vane.

4. The engine as defined in claim 1, wherein a circumferential spacing between adjacent ones of the vanes is irregular.

5. The engine as defined in claim 1, wherein at least some of the vanes have different stagger angles from one another.

6. The engine as defined in claim 1, wherein the vanes each have a stagger angle of 20 degrees or less adjacent the inlet wall.

7. The engine as defined in claim 1, wherein the vanes are pivotally retained to the inlet wall such that the vanes each have a variable stagger angle.

8. The engine as defined in claim 1, further comprising a heating system in heat exchange relationship with the vanes.

9. The engine as defined in claim 8, wherein the heating system includes a heated fluid circulated around the inlet wall radially outwardly of the inlet flow path and in heat exchange relationship with the vanes.

10. The engine as defined in claim 1, wherein each of the vanes has a chord extending between the leading and trailing edges of the vane, the chord defining a chord length, and a ratio of the maximum height over the chord length is 0.5 or lower.

11. A gas turbine engine comprising:
   a propulsive fan including an array of circumferentially spaced blades configured for rotation, each of the blades extending radially between a root and a tip with a maximum radial dimension between the root and the tip defining a maximum blade span;
   an annular inlet including:
      an axially extending wall, the wall having an upstream wall portion extending axially upstream from the fan blades, the upstream wall portion defining an inlet flow path for directing air to the propulsive fan, and
      a plurality of vanes circumferentially spaced around the inlet and extending radially inwardly from the upstream wall portion, each of the plurality of vanes having an airfoil cross-section including a pressure wall and a suction wall extending chordwise between a leading edge and a trailing edge, a maximum radial distance between a tip of the vanes and the upstream wall portion defining a maximum height of the vanes, the maximum height being at most 50% of the maximum blade span, and wherein the vanes are oriented to induce a swirl in an incoming flow within an annular outer portion of the inlet flow path about a rotation axis of the propulsive fan in a direction of rotation of the propulsive fan.

12. The engine as defined in claim 11, wherein the maximum height of the vanes is 25% or less than the maximum blade span.

13. The engine as defined in claim 11, wherein a circumferential spacing between adjacent ones of the vanes is irregular.

14. The engine as defined in claim 11, wherein at least some of the vanes have different stagger angles from one another.

15. The engine as defined in claim 11, further comprising a heating system in heat exchange relationship with the vanes.

16. The engine as defined in claim 11, wherein the vanes have respective chords extending between the leading and trailing edges of the vanes, the chord defining a chord length, and a ratio of the maximum height over the chord length is 0.5 or lower.

17. A method of reducing a relative Mach number at tips of propulsive fan blades of a gas turbine engine, the method comprising:
   directing a flow of air to the fan blades through an inlet flow path having a downstream radial height adjacent the fan blades, including:
      using guide vanes, swirling the flow of air upstream of the blade tips within an annular outer portion of the inlet flow path, the annular outer portion extending a radial distance from a wall surrounding the inlet flow path, the radial distance being at most 50% of the downstream radial height, wherein swirling the flow of upstream air comprises turning the flow of upstream air in a direction of rotation of the fan blades about an axis of rotation of the fan blades, each of the guide vanes having an airfoil cross-section including a pressure wall and a suction wall extending chordwise between a leading edge and a trailing edge; and
   allowing the flow of air to flow freely within a remaining central portion of the inlet flow path.

18. The method as defined in claim 17, wherein the radial distance of the annular outer portion is at most 25% of the downstream radial height.

19. The method as defined in claim 17, wherein swirling the flow of air is performed at different angles along a circumference of the inlet flow path.

20. The method as defined in claim 17, wherein swirling the flow is performed at an angle of 20 degrees or less adjacent the wall with respect to a central longitudinal axis of the wall.

* * * * *